C. W. & W. W. MARSH.
Harvester.
No. 6,329. Reissued March 9, 1875.
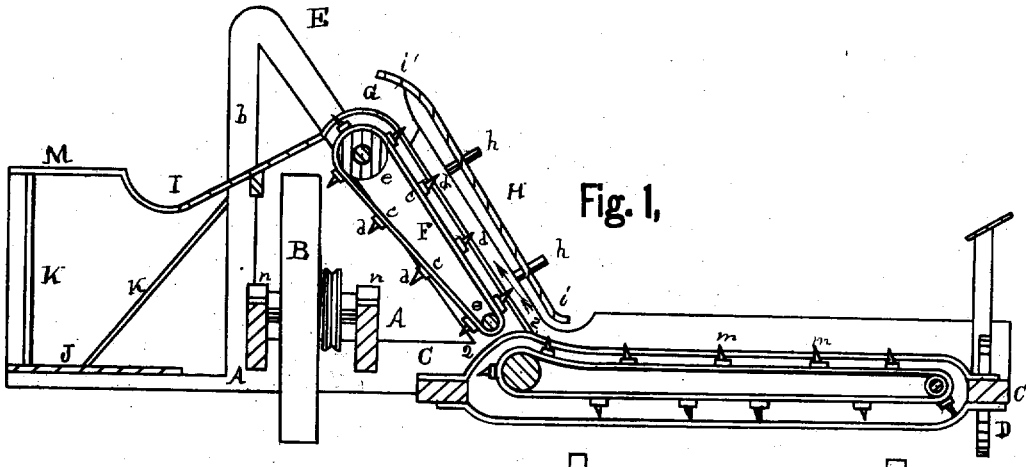
Fig. 1,
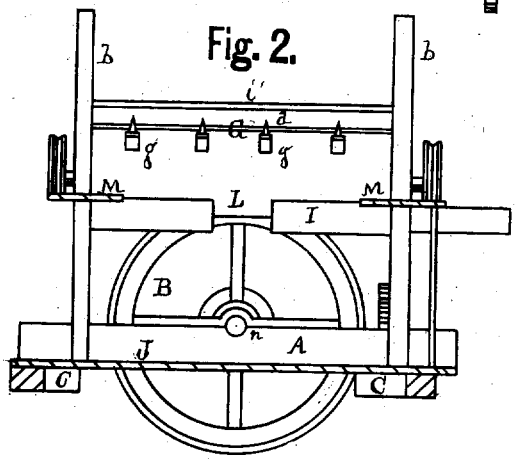
Fig. 2.
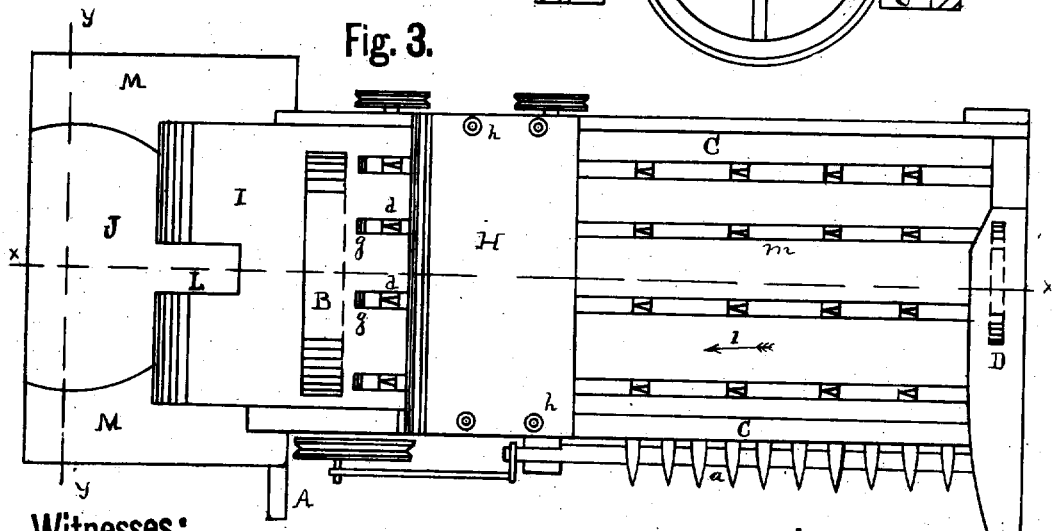
Fig. 3.
Witnesses:
Henry A. Sardner Jr
O. V. Bond
Inventors.
Chas W. Marsh
Wm W. Marsh
By Wm H. Bond Atty.
N. PETERS, PHOTO-LITHOGRAPHER, WASHINGTON, D. C.

UNITED STATES PATENT OFFICE.

CHARLES W. MARSH AND WILLIAM W. MARSH, OF SYCAMORE, ILLINOIS.

IMPROVEMENT IN HARVESTERS.

Specification forming part of Letters Patent No. 21,207, dated August 17, 1858; reissue No. 1,719, dated July 5, 1864; reissue No. 2,014, dated June 27, 1865; extended seven years; reissue No. 6,329, dated March 9, 1875; application filed February 3, 1875.

DIVISION A.

*To all whom it may concern:*

Be it known that we, CHARLES W. MARSH and WILLIAM W. MARSH, formerly of Shabbona, in the county of De Kalb, and now of Sycamore, in the county of De Kalb, and State of Illinois, have invented certain new and useful Improvements in Harvesters; and we do declare that the following is a full, clear, and exact description of the same, reference being had to the accompanying drawings, making a part of this specification, in which—

Figure 1 is a longitudinal vertical section taken on line *x x* of Fig. 3; Fig. 2, a transverse vertical section on line *y y* of Fig. 3, and Fig. 3 a plan or top view.

Similar letters of reference indicate the same parts in the several figures.

This invention relates to an improved method of elevating the cut grain from the level of the platform of a harvester, and delivering it into an elevated grain-receptacle.

In the drawings, A represents the main frame of a harvester; B, the driving-wheel, and C the platform-frame, within which frames are placed the drive-wheel B and a grain-wheel, D, at their proper places, as shown. The platform-frame C is attached to the main frame, and within it is placed an endless band of rakes, which shall carry the cut grain in the direction indicated by the arrow 1, Fig. 3. At the front of this platform a reciprocating sickle, *a*, is placed, which is arranged in the usual or in any proper way, and is operated from the driving-wheel B by any suitable device. To the platform-frame C, at 2, Fig. 1, an inclined frame, E, is attached, which is supported at the upper end by uprights *b b*. An endless band of rakes is placed within this frame E, which has the same inclination as the frame, and which moves in the direction indicated by the arrow 2.

The bars *c* are filled with the needed number of teeth *d*, and form rakes, which are fastened to a band at each end, and constitute the band of rakes F, which is placed beneath the slotted plate G, and over the rollers *e e*, so that the teeth *d* protrude through the slots or grooves *g*. The rollers *e e* have their bearings in the frame E. H is a loose or floating cover, placed over the slotted plate G and above the teeth *d*. It is kept in position by pins *h h h h*, which have sufficient play in the holes through which they pass, to allow the cover to rise or fall freely at all points, and permit it to conform to the quantity or position of the grain passing under it. This cover has the edge *i* of its lower end sufficiently turned up to allow the cut grain to pass readily under, and the upper end *i'* is turned down, so as to deflect the grain toward the receptacle I, and deliver it therein more compactly. M M are binders' tables, and J the binders' platform, which are not more particularly described, as they form the main feature of our reissued patent No. 2,015.

The operation is as follows: The machine is drawn along and the cut grain falls upon the carrier behind the sickle, and is carried toward the elevator or band of rakes F, to which it is delivered in a continuous stream. The band of rakes F carries the grain up under the cover H, and delivers it into the receptacle I. One or more attendants stand on the platform J and take sheaves or gavels from the receptacle I as they collect there, and bind them on the tables M M. The cover H, being attached in a loose or yielding manner, adapts itself to the volume of grain being carried up under it, yielding or giving as circumstances may require, and holding it in proper position. The grain passes freely under the cover, and the turned-down portion *i'* directs it toward the receptacle I. Thus, it will be seen that by this method the grain will be elevated to the height required by the position of the receptacle I, and will be steadily and compactly delivered thereon without any break or interruption in its flow.

What we claim in this division of reissue as new, and desire to secure by Letters Patent, is—

1. The secondary band of rakes F, consisting of toothed slats extending across on the under side of a slotted platform, the teeth protruding through the slots, in the manner described, and used in connection with a binders' grain-receptacle, substantially as and for the purposes set forth.

2. The curved or bent deflector *i'*, forming a part of the cover, in combination with the grain-elevating mechanism and grain-receptacle, whereby the upward direction of the grain will be changed toward the receptacle, substantially as set forth.

CHARLES W. MARSH.
WILLIAM W. MARSH.

Witnesses:
ARTHUR M. STARK,
CHARLES W. MOSHER.